Jan. 20, 1959 P. L. MARSHALL 2,869,805
CONTROL SURFACE
Filed June 20, 1956 3 Sheets-Sheet 1

INVENTOR.
PETER L. MARSHALL
BY William R. Lane
ATTORNEY

Jan. 20, 1959 P. L. MARSHALL 2,869,805
CONTROL SURFACE
Filed June 20, 1956 3 Sheets-Sheet 3
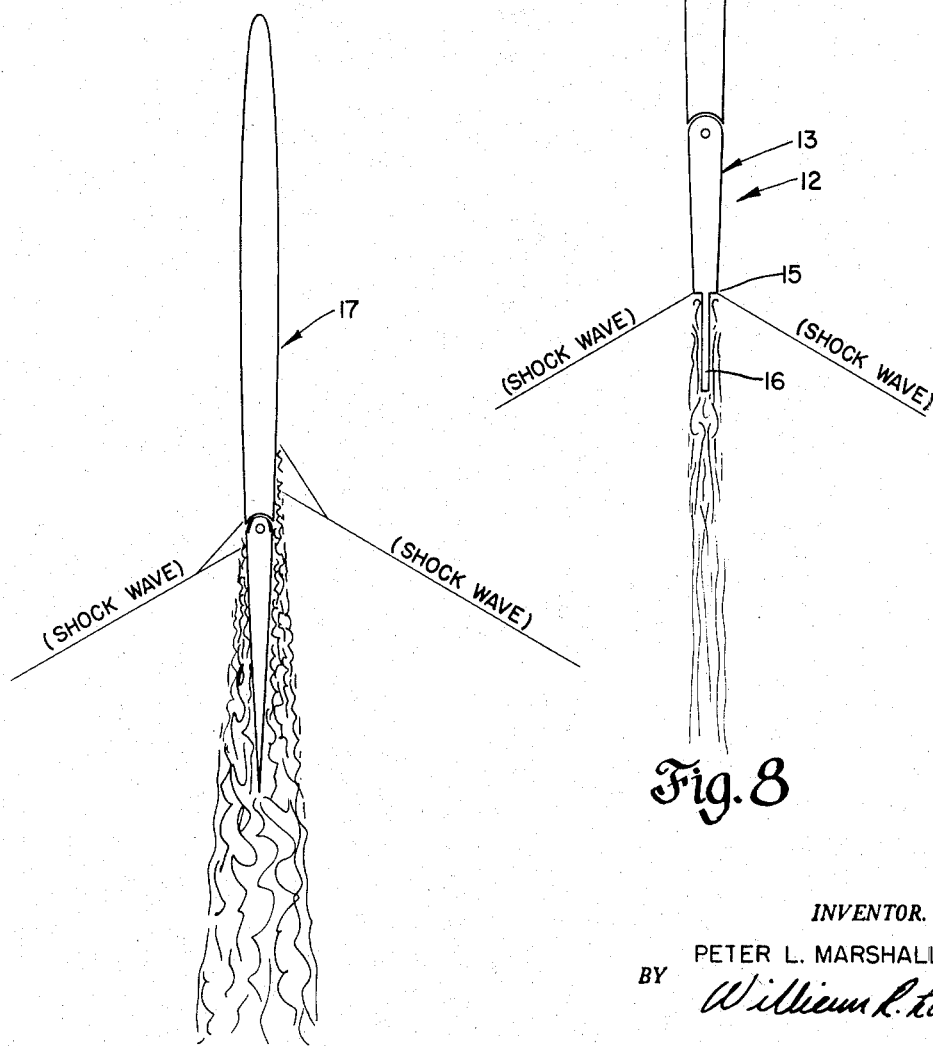
INVENTOR.
PETER L. MARSHALL
BY William R. Lane
ATTORNEY – # United States Patent Office 2,869,805
Patented Jan. 20, 1959

2,869,805

CONTROL SURFACE

Peter L. Marshall, Columbus, Ohio, assignor to North American Aviation, Inc.

Application June 20, 1956, Serial No. 592,548

5 Claims. (Cl. 244—87)

The present invention relates broadly to aircraft, and is more particularly concerned with novel means for substantially entirely eliminating high frequency control surface vibration.

Recently, with the advent of high performance military aircraft, there has been encountered a rather serious problem termed in the art "control surface buzz." This phenomenon, which even at the present time is not completely understood, has upon occasion been of sufficiently high frequency and amplitude to cause structural damage to the control surface and main stabilizer assemblies on certain aircraft. And while applicant is not entirely certain as to the cause or causes of this action, it is believed that during flight at transonic speeds there is an unsteady shock wave formation upon opposite surfaces of the airfoil. This formation, which will be referred to in greater detail hereinafter, is thought to comprise a plurality of shock waves moving forwardly and rearwardly along the control surface chordwise thereof, producing variable or fluctuating pressures at opposite surfaces of the airfoil member. Such variations in pressure between opposite faces of the control surface apparently cause extremely high frequency oscillations of generally constant amplitude, producing "buzz" as distinguished from the varying amplitude oscillations of classical flutter. And as noted, this type of control surface vibration is capable of producing structural damage, and when of lesser severity, has been found to reduce to a substantial degree the effectiveness of the control surface. In addition, it has been indicated that "buzz" can be a disturbing influence on the pilot, and in military aircraft, may consequently reduce his combat efficiency.

It is therefore an important aim of the present invention to provide a novel means of substantially entirely eliminating aerodynamic buzz, said means being relatively simple in construction, light in weight and low in cost.

Another object of the invention lies in the provision of a new and improved control surface construction adapted to prevent the occurrence of aerodynamic buzz by causing the attachment of the shock waves at a predetermined location along the control surface chord.

Still another object of this invention is to provide a novel structural arrangement for control surfaces characterized by a lowered mass moment of inertia, as well as improved control surface effectiveness without noticeable adverse effects upon drag or hinge moment characteristics.

A further object of the invention is to provide a control surface of novel construction comprising an airfoil section preferably provided with a relatively blunt trailing edge and a plate member attached thereto, said control surface being characterized by a substantial freedom from high frequency vibrations during flight.

A further object of the present invention lies in the provision of a new and improved control surface of the character above described in which a substantial portion thereof is preferably of relatively greater thickness than conventional airfoils, whereby there is provided a structural torque box of relatively greater strength.

Other objects and advantages will become more apparent during the course of the following description, particularly when taken in connection with the accompanying drawings.

In the drawings, wherein like numerals are employed to designate like parts throughout the same:

Fig. 7 is a cross-sectional representation of a conventional airfoil during transonic flight, there being shown typical shock wave locations on opposite sides of the control surface and airfoil, as well as a turbulent wake issuing therefrom; and Fig. 8 is a cross-sectional representation of applicant's novel airfoil including a splitter plate control surface, and showing during transonic flight conditions attachment of the shock waves and a relatively undisturbed wake flowing rearwardly from the control surface.

Figures 1, 2, 3, 4:
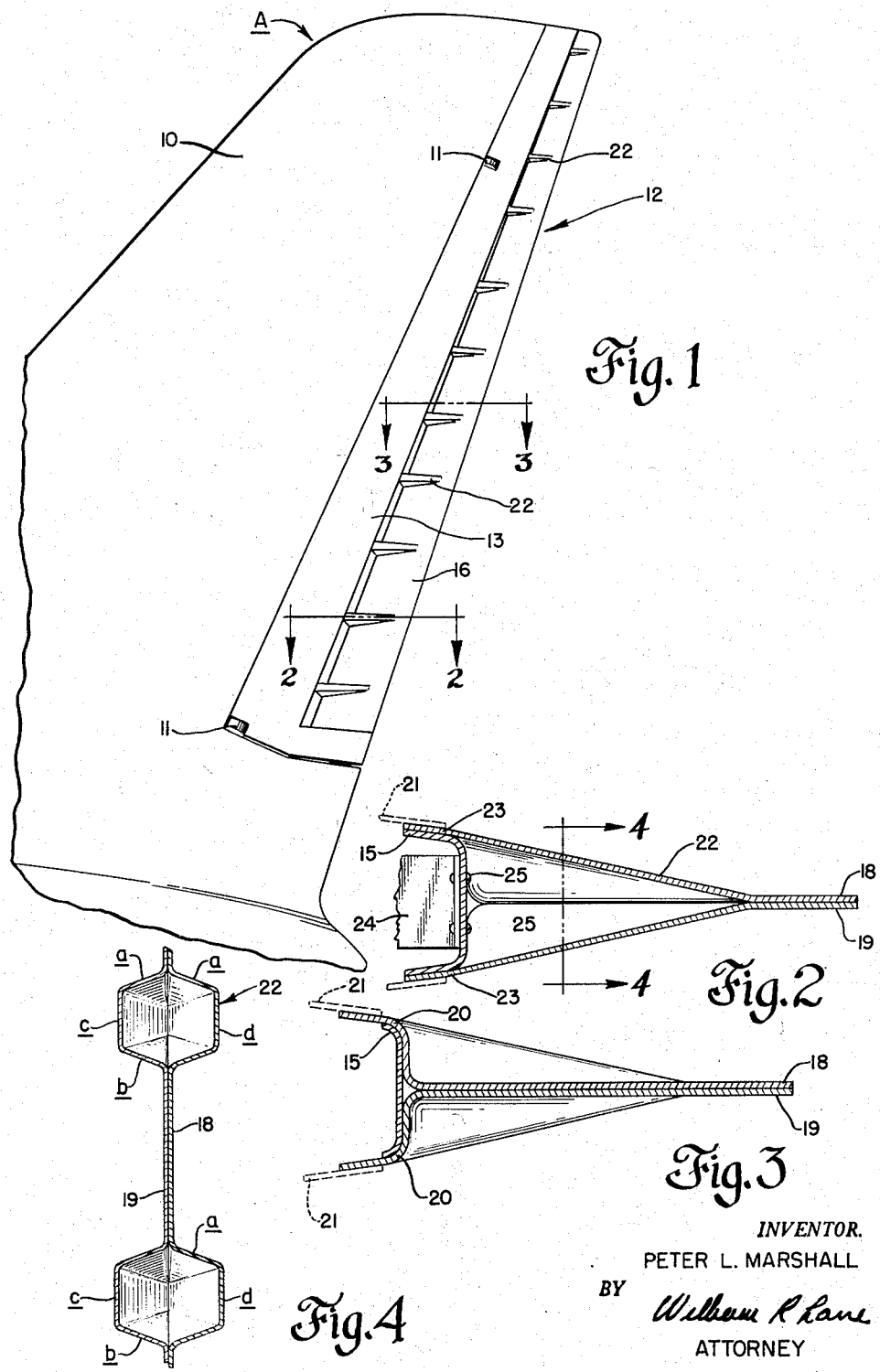
Fig. 1 is a perspective view of a typical aircraft vertical tail assembly, and showing a preferred form of applicant's invention.
Fig. 2 is a cross-sectional view of the preferred splitter plate control surface, taken substantially along the line 2—2 of Fig. 1.
Fig. 3 is also a cross-sectional view of the present invention, but taken substantially along the line 3—3 of Fig. 1.
Fig. 4 is a vertical cross-section taken substantially along the line 4—4 of Fig. 2, and showing in particular a preferred means for reinforcing the splitter plate.

With reference now to the drawings, and more particularly to Fig. 1 thereof, there is shown a vertical tail assembly A comprising a fixed portion 10 to which is pivotally attached by suitable hinge means 11 applicant's novel splitter plate rudder 12. As earlier noted, the splitter plate construction may be employed in connection with control surfaces in general, including by way of illustration and without limitation, elevators, stabilizers, rudders and ailerons. Thus, while as applied to a rudder the novel construction herein disclosed has to date produced particularly desirable results, by way of aerodynamic buzz elimination and improved surface control effectiveness, experience has also demonstrated that substantial improvement is also obtained with other of the control surfaces noted. As for example, a splitter plate employed in combination with ailerons reduces drag, this apparently being due to reduced turbulence which is caused by moving the location of the shock waves rearwardly and attaching said waves to the control surface adjacent the splitter plate. In addition, work thus far has indicated that a splitter plate associated with wing tips also reduces drag by substantially eliminating undesirable turbulence. Further, the splitter plate type construction may be employed in connection with blade vibration problems which may arise on turbine type engines from aerodynamic causes. Other specific applications of the present invention will no doubt become apparent to those versed in the art.

The splitter plate rudder 12 may be utilized with either a full span rudder or as a part of a partial span rudder as shown in Fig. 1. Each has a particular advantage, a full span rudder generally providing better control, while a partial span rudder normally reduces the area, considered in terms of distance versus speed, wherein buzz is likely to occur. In either construction, however, it is preferred that the splitter plate control surface be fabricated in substantially the configuration appearing in the drawings. Thus, the novel rudder 12 may comprise a relatively thick forward portion 13 of airfoil shape having a generally round leading edge or nose portion 14 and a substantially square trailing edge 15 to which is rigidly attached substantially midway of its thickness a relatively thin and flat plate member 16, termed herein the "splitter plate." As appears in Fig. 5, the rudder 12 presents in cross-section an outline of relatively greater thickness than a conventional rudder 17, the cross-sectional shape of which is superimposed in dotted lines. This provides a substantially stronger structural torque box, while the specific advantages of the square or flat trailing edge 15 over other configurations will be dealt with hereinafter.

The relatively flat member or splitter plate 16 may be formed and attached to the forward portion 13 of the rudder in a number of various ways, a preferred manner which has proven well in practice being shown in Figs. 2 and 3. As appears, the splitter plate may comprise a pair of substantially flat metallic sheets 18 and 19 of aluminum alloy or the like suitably secured in face to face relation, and provided with curved end sections 20 adapted to partially surround the trailing edge 15 of the rudder forward portion 16. Said metallic sheets 18 and 19 may be fastened one to the other by means such as welding, while similar means may be employed to attach the curved ends of said sheets to the forward portion trailing edge 15 of the rudder 12. To provide a substantially smooth surface along the rudder, the skins 21 on opposite surfaces thereof may overlap the curved end sections 20 of the splitter metal sheets 18 and 19.

In order to impart the desired rigidity to the splitter plate 16, reinforcing or bracing members 22 may be employed at spaced locations thereon. Such members may be of substantially triangular shape in cross-section, and if desired, may be of a hollow construction wherein the top wall $a$, bottom wall $b$ and side walls $c$ and $d$ of each reinforcing member 22 taper rearwardly and thereby present a convergent structure as shown in Fig. 4. As appears in Fig. 2, each of the bracing members preferably is provided with a forward extension 23 arranged to overlap the square trailing edge 15 of the rudder forward portion 13, said extension in turn being overlapped by the rudder skins 21. The trailing edge 15 may include a structural rib 24 to which the reinforcing members 22 may be secured by rivets, bolts or the like 25, and in addition, said members 22 may be welded or otherwise attached along their top or bottom walls to the sheets 18 and 19 forming the splitter plate 16. In the interest of economy of weight, the bracing members 22 preferably do not extend to the extreme trailing edge of the splitter plate 16, and are normally spaced from one another spanwise of the rudder by approximately twelve to eighteen inches.

Experience has demonstrated that particularly desirable results by way of aerodynamic buzz elimination are obtained when the splitter plate is of a length measured from its leading to trailing edges which is generally 30 to 70% of the control surface chord, and more specifically, approximately 50% thereof. And while under certain conditions the length of the splitter plate may be accurately expressed relative to the entire vertical tail chord or other airfoil with which it is associated, it has been found that optimum results are more frequently produced when splitter plate length is related to control surface chord, and preferably in the 30 to 70% relationship noted.

Figure 5:
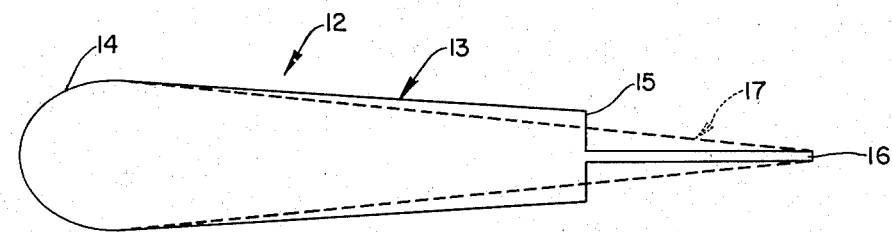
Fig. 5 is a cross-sectional representation of the preferred splitter plate control surface, a conventional control surface being shown thereon by phantom lines.

As indicated earlier with reference to Fig. 5, it is preferred at present that the trailing edge 15 of the control surface be substantially flat and that there be relatively little, if any, taper in the forward portion 13 of said surface. In other words, it has been found desirable that the thickness of the trailing edge 15 of the control surface be not substantially less than the thickness of the relatively blunt nose 14; however, the thickness may range from that of the conventional airfoil along the line at which the splitter plate is to be attached up to the thickness of the leading edge or nose of the control surface. This may be expressed relatively as the thickness of the conventional airfoil at that location where the splitter plate will be secured up to 100% of the maximum thickness of the entire surface including the fixed or immovable portion thereof. The thickness ultimately selected for a particular set of conditions will of course depend upon a number of factors, among which is the desired ratio of splitter chord to control surface chord. However, generally speaking, the trailing edge to which the splitter plate is attached should preferably present in cross-section a relatively square blunt outline of the character shown in Fig. 5.

Figure 6:
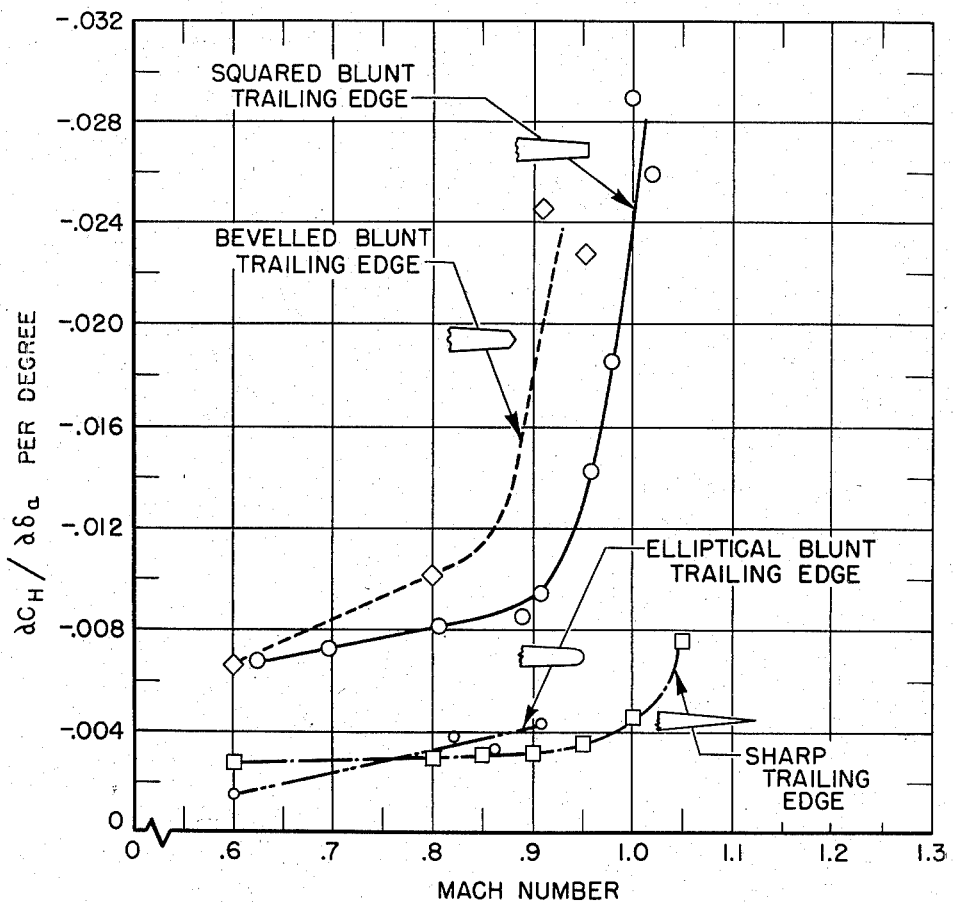
Fig. 6 is a graph plotting rate of change of hinge moment to deflection against Mach number, indicating the relative variation of aerodynamic "stiffness" of a squared blunt trailing edge as compared to other trailing edge geometries.

The efficacy of the preferred trailing edge configuration is well illustrated in Fig. 6, wherein there is compared in graph form the gradient of aileron hinge moment coefficient with aileron deflection as a function of Mach number for several trailing edge shapes. Thus, designating aileron hinge moment by the symbol $C_H$ and aileron deflection as $\delta_a$, it may be seen that through the transonic speed range, wherein buzz has been found most likely to occur, that the substantially square blunt trailing edge provides a substantial increase in aerodynamic stiffness which is defined as the ratio $$\frac{\partial C_H}{\partial \delta_a}$$

Viewing the presented graph of experimental and flight test data on F-86 series military jet aircraft, it is to be noted that between Mach 0.8 and 1.2, generally considered to be the transonic region, the square blunt trailing edge shows a relatively rapid increase in "stiffness" and thus provides a substantial resistance to forces which would tend to move the control surface in a single direction. The bevelled blunt trailing edge, on the other hand, generally performs well; however, its increase in aerodynamic stiffness may be seen to begin relatively lower in the subsonic range and to approach the desired maximum resistance somewhat more early or short of Mach 1.0 than the preferred configuration. Also, bevelled blunt trailing edges have in the past been found to be prone to a type of aerodynamic stability leading to the phenomenon termed "snaking." The elliptical blunt and sharp trailing edges, it may be noted, provide a relatively slight increase in $$\frac{\partial C_H}{\partial \delta_a}$$

throughout the transonic range, and thus may be anticipated to be generally less effective in association with a splitter plate in substantially eliminating aerodynamic buzz.

As earlier stated, the vibrational phenomenon referred to as "buzz" is not at present completely understood, being encountered only recently as military aircraft reached sonic speeds. It is thought, however, that during flights at transonic speeds there is a formation of shock waves on opposite surfaces of the aileron, rudder or the like which is highly unsteady. Said waves are inclined to travel back and forth chordwise of the control surface, as portrayed in Fig. 7, and by doing so create uneven or fluctuating pressures on opposite faces of the control surface and produce a high frequency flutter or "buzz." Associated with the described phenomenon of unsteady shock wave formation and fluctuating pressures is the creation of a turbulent wake issuing rearwardly from the control surface in the manner shown in Fig. 7, this apparently being due to unsteady flow separation and a mixing or reinforcement of the trailing edge vortices.

Unsteady shock wave formation and mixing of the vortices is substantially entirely prevented, however, and creation of the noted pressure fluctuations avoided by the above-described splitter plate control surface construction.

A comparison of Figs. 7 and 8 serves to illustrate the effects produced during flight by the conventional arrangement and by applicant's novel structure, the latter figure portraying the attachment of the shock waves generally at the corners of the square blunt trailing edge and the issuance from the splitter plate control surface of a relatively undisturbed wake. It may thus be seen that substantial movement of the shock waves chordwise of the surface is effectively eliminated, and thereby, steady or uniform pressures on opposite surfaces of the control device provided. High frequency vibration of the surface is hence substantially entirely eliminated, and in addition, there is avoided the relatively high drag associated with the turbulent wake of earlier constructions. This is believed explainable by the action of the splitter plate in functioning as a separator or shelf to almost entirely prevent mixing and consequent reinforcement of the trailing edge vortices. By so doing, the vortices in a sense trail away and lose much of their effectiveness, producing among other advantages a much more stable air flow and important reduction in over-all drag.

In addition to substantially entirely eliminating aerodynamically forced buzz, the novel construction herein disclosed has the further important advantages of improved strength with a low mass moment of inertia. Thus, by preferably thickening or expanding the airfoil adjacent the area of attachment of the splitter plate, there is provided a basically stronger structural torque box, and by reason of a reduction in weight of the control surface trailing edge through provision of a relatively light splitter plate, the mass moment of inertia is lowered. Further, due largely to the stabilized flow associated with applicant's structure, an important reduction in drag has been noted and the effectiveness of the control surface substantially improved. In addition, it has been found that the relatively light construction provided facilitates installation of mass balance in restricted space areas.

It is to be understood that the form of the invention herein shown and described is to be taken as a preferred embodiment of the same, and that various changes in the shape, size and arrangement of parts may be resorted to without departing from the spirit of the invention and the scope of the subjoined claims.

I claim:

1. An aircraft control surface comprising a forward section of aerodynamic configuration in its leading edge portion, and a plate member of substantially less thickness than said forward section and fixedly connected to and extending rearwardly from said forward section, said forward section having a generally blunt trailing edge located in that chordwise region of said control surface which extends from approximately thirty percent to approximately seventy percent of the chord length thereof and having a surface portion forming a line of joinder with said blunt trailing edge, and said line of joinder being transversely offset from a surface of said plate member a distance equal to at least approximately one-half the thickness of an aerodynamically contoured control surface of equal chord length at the same location in said chordwise region, thereby substantially eliminating aerodynamic buzzing of the control surface during transonic velocity flight.

2. An aircraft control surface effective to eliminate aerodynamic oscillation thereof during transonic flight, comprising: a forward section having opposed surfaces in its main body portion, a plate-like member fixedly secured to said forward section and extending chordwise and rearwardly thereof, and a substantial transverse offset joining each forward section opposed surface with said plate-like member for restricting the relative location of a shock wave associated with said control surface during said transonic flight, said substantial transverse offset being positioned in the region of from approximately thirty percent to approximately seventy percent of the chordwise length of said control surface, said control surface chordwise length being comprised of the chordwise length of said forward section plus the chordwise length of said plate-like member.

3. The control surface defined in claim 2, wherein said transverse offset has a line of joinder with the forward section opposed surface asosciated therewith, said line of joinder being offset from a surface of said plate-like member a distance equal to at least approximately one-half the thickness of an aerodynamically contoured control surface of equal chord length at a comparable location in said chord length.

4. An aircraft control surface comprising a forward section having opposed surfaces, a plate member fixedly secured to said forward section and having opposed surfaces extending rearwardly of said forward section opposed surfaces, and transversely oriented intermediate surface portions connecting each said forward section opposed surface with a respective plate member opposed surface, each said intermediate surface portion forming a line of joinder with the forward section opposed surface associated therewith, and each said line of joinder being transversely offset from the respective plate member opposed surface associated therewith a distance not less than approximately one-half the thickness of a conventionally contoured control surface at a similar location with respect to chordwise length, thereby substantially eliminating aerodynamic oscillation of said control surface during flight at transonic velocities.

5. An aircraft vertical tail assembly including a fixed section and a movable section attached thereto, said movable section comprising a relatively thick forward portion having a substantially round leading edge and an essentially square trailing edge, and a splitter plate member of substantially lesser thickness than said forward portion and rigidly secured to the trailing edge of the forward portion generally mid-way between opposite surfaces thereof, said splitter plate member including a pair of metallic sheets maintained in superimposed relation throughout a substantial portion of their lengths and being provided forwardly thereof with curved extensions engageable with the trailing edge of said forward portion, the relative length of said splitter plate member being not substantially greater than said forward portion.

References Cited in the file of this patent
UNITED STATES PATENTS

| | | |
|---|---|---|
| 2,542,202 | McGuire | Feb. 20, 1951 |
| 2,734,700 | Metcalf | Feb. 14, 1956 |